(12) United States Patent
Ito

(10) Patent No.: US 7,469,098 B2
(45) Date of Patent: Dec. 23, 2008

(54) OPTICAL APPARATUS

(75) Inventor: Kenji Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 494 days.

(21) Appl. No.: 11/179,318

(22) Filed: Jul. 11, 2005

(65) Prior Publication Data

US 2006/0008265 A1    Jan. 12, 2006

(30) Foreign Application Priority Data

Jul. 12, 2004    (JP)    ............................ 2004-204649

(51) Int. Cl.
G03B 3/00    (2006.01)
G03B 13/00    (2006.01)

(52) U.S. Cl. ...................................... 396/104; 396/125

(58) Field of Classification Search ................. 396/104, 396/125–128, 51; 348/208.4, 350, 353
See application file for complete search history.

(56) References Cited

U.S. PATENT DOCUMENTS

| | | | | |
|---|---|---|---|---|
| 5,208,625 | A * | 5/1993 | Suekane | 396/95 |
| 5,597,999 | A | 1/1997 | Kinba et al. | |
| 5,913,079 | A * | 6/1999 | Aoyama et al. | 396/51 |
| 6,308,015 | B1 | 10/2001 | Matsumoto | 396/106 |
| 6,826,363 | B2 * | 11/2004 | Taka | 396/125 |
| 2001/0026683 | A1 | 10/2001 | Morimoto et al. | |
| 2004/0057712 | A1 | 3/2004 | Sato et al. | 396/89 |

FOREIGN PATENT DOCUMENTS

| | | |
|---|---|---|
| JP | 7-043605 | 2/1995 |
| JP | 2004-157456 | 6/2004 |
| JP | 2004-184952 | 7/2004 |

OTHER PUBLICATIONS

International Search Report dated Mar. 2, 2006. All of the documents listed on the Search Report were submitted with our IDS dated Dec. 15, 2005 with the exception of the document listed on the enclosed PTO1449A.
Communication from the European Patent Office dated Mar. 10, 2006.

(Continued)

*Primary Examiner*—Melissa Jan Koval
(74) *Attorney, Agent, or Firm*—Morgan & Finnegaan LLP (57) ABSTRACT

An optical apparatus which achieves fast focusing operation and allows accurate focusing is disclosed. The optical apparatus includes a first focus detector which detects a focus state on a subject, a second focus detector which detects a focus state on the subject in a detection method different from a detection method of the first focus detector, and a controller which has a function of detecting whether or not the subject is a moving body and a function of performing focus control of an image-taking optical system in a first sequence in which at least one of the first and second focus detectors is used and a second sequence in which at least the other of the focus detectors is used. The controller preferentially uses one of the first and second sequences depending on the result of the detection with the moving body detecting function.

3 Claims, 11 Drawing Sheets

OTHER PUBLICATIONS

European Search Report dated Mar. 2, 23006. All of the documents listed in the Search Report were submitted with our IDS dated Dec. 15, 2005 with the exception of the document listed on the enclosed PTO 1449A.

English Abstract for Japanese Patent Application JP 7-043605.

EPO Patent Abstracts of Japan for 2004-184952.

EPO Patent Abstracts of Japan for 2004-157456.

EPO Partial Search Report for Application No. 05254369.1, dated Nov. 11, 2005.

* cited by examiner

OPTICAL APPARATUS

BACKGROUND OF THE INVENTION

The present invention relates to an optical apparatus such as a camera, and more specifically, to focusing operation and control thereof.

In recent years, so-called digital cameras have been prevalent in which an image-taking optical system focuses a subject image onto a semiconductor image-pickup device (such as a CCD sensor and a CMOS sensor) for conversion into an electric signal and the resulting image information is recorded on a recording medium such as a semiconductor memory and a magnetic disk.

The electronic camera of this type is equipped with an auto-focus (AF) function of controlling image-taking conditions in order to automatically focus on a subject image. As methods of the auto-focus control, a contrast AF method and a phase difference detection AF method are adopted.

Known contrast AF methods include a climbing method in which a focus lens is moved in a direction in which the high-frequency component of a luminance signal (hereinafter referred to as an AF evaluation value (sharpness)) provided by an image pick-up device increases and the position of the lens where the AF evaluation value is at the maximum is set to an in-focus position, and a full range scan method in which AF evaluation values are stored while a focus lens is driven throughout the distance-measuring range and the position of the lens corresponding to the maximum of the stored AF evaluation values is set to an in-focus position. In particular, the contrast AF method is widely utilized since the image-pickup device for imaging is used without any change and the AF evaluation value is detected from output from the image-pickup device.

Single-lens reflex cameras employ the phase difference detection AF method. In the phase difference detection method, luminous fluxes are passed through the mirror areas of a plurality of different image-taking lenses for an imaging plane and an optical system is provided for secondary image formation of the luminous fluxes.

The two images formed through the secondary image formation are detected by two line sensors, and the phase difference between the data of the two images is detected to determine the defocus state (amount) of the subject image. The in-focus position is calculated and necessary lens driving is performed, thereby realizing control to achieve an in-focus state.

In addition, focus control of a hybrid AF method has been proposed as a combination of these AF methods. In the hybrid AF method, a focus lens is driven to near an in-focus point in the phase difference detection AF method and then the focus lens is drive to the in-focus position more accurately in the contrast AF method, by way of example (Japanese Patent Laid-Open No. 7-043605).

The focus detection in the contrast AF method, however, can only cover a narrow range of defocus amounts, so that the focus detection is difficult to perform when the image is significantly out of focus. In addition, since it takes a long time to move the focusing lens from the infinity end to the closest end in order to search for an in-focus position, the method is inappropriate for a system requiring fast operation and image-taking of a subject who moves quickly. Moreover, the high-frequency component of a luminance signal is not changed largely at positions away from an in-focus position, so that it is difficult to know whether defocus is caused by front focus or rear focus.

The focus detection in the phase difference detection AF method has the problem of involving a dead zone in its focus detection area although it can cover a wide range of defocus amounts. Also, since the movement amount of a focus lens is determined on the basis of a difference between the positions of the image formation on the image-pickup device, the AF range is limited in some of image-pickup devices and lens systems. Thus, when the infinite end and the closest end are greatly separated from each other and a lens system is set to allow AF control throughout the image-taking range, resolution may be reduced by reason of the size of the image-pickup device or the like to result in reduced AF accuracy.

In view of those situations, the hybrid AF method disclosed in Japanese Patent Laid-Open No. 7-043605 attempts to address the abovementioned problems by performing coarse adjustment with the focus detection of the phase difference detection method and fine adjustment with the focus detection of the contrast method, and then focusing operation of the focus lens.

However, the focus detection of the contrast method is performed at all times even when only the focus detection of the phase difference detection method can provide sufficient auto-focus in terms of focus accuracy, so that focusing operation takes a long time. This may cause missing of an opportunity to take images of a quickly moving subject or require a long time for each image-taking operation.

BRIEF SUMMARY OF THE INVENTION

It is an object of the present invention to provide an optical apparatus which achieves fast focusing operation and allows accurate focusing.

According to an aspect, the present invention provides an optical apparatus including a first focus detector which detects a focus state on a subject, a second focus detector which detects on focus state of the subject in a detection method different from a detection method of the first focus detector, and a controller which has a function of detecting whether or not the subject is a moving body and a function of performing focus control of an image-taking optical system in a first sequence in which at least one of the first and second focus detectors is used and a second sequence in which at least the other of the focus detectors is used. The controller preferentially uses one of the first and second sequences depending on the result of the detection with the moving body detecting function.

According to another aspect, the present invention provides an optical apparatus including a first focus detector which detects a focus state on a subject, a second focus detector which detects a focus state on the subject in a detection method different from a detection method of the first focus detector, and a controller which performs focus control of an image-taking optical system in a first sequence in which at least one of the first and second focus detectors is used and a second sequence in which at least the other of the focus detectors is used. The controller preferentially uses one of the first and second sequences depending on a change amount of the result of a plurality of detections with the first focus detector.

According to yet another aspect, the present invention provides an optical apparatus including a first focus detector which detects a focus state on a subject, a second focus detector which detects a focus state on the subject in a detection method different from a detection method of the first focus detector, a focal length detector which detects a focal length of an image-taking optical system, and a controller which performs focus control of the image-taking optical system in a first sequence in which at least one of the first and second focus detectors is used and a second sequence in which at least the other of the focus detectors is used. The controller preferentially uses one of the first and second sequences depending on the result of the detection with the focal length detector.

Other objects and features of the present invention will become readily apparent from the following description of the preferred embodiments with reference to accompanying drawings.

DETAILED DESCRIPTION OF THE PREFERRED EMBODIMENTS

Preferred embodiment of the present invention will hereinafter be described with reference to the drawings.

Embodiment 1

Figure 1:
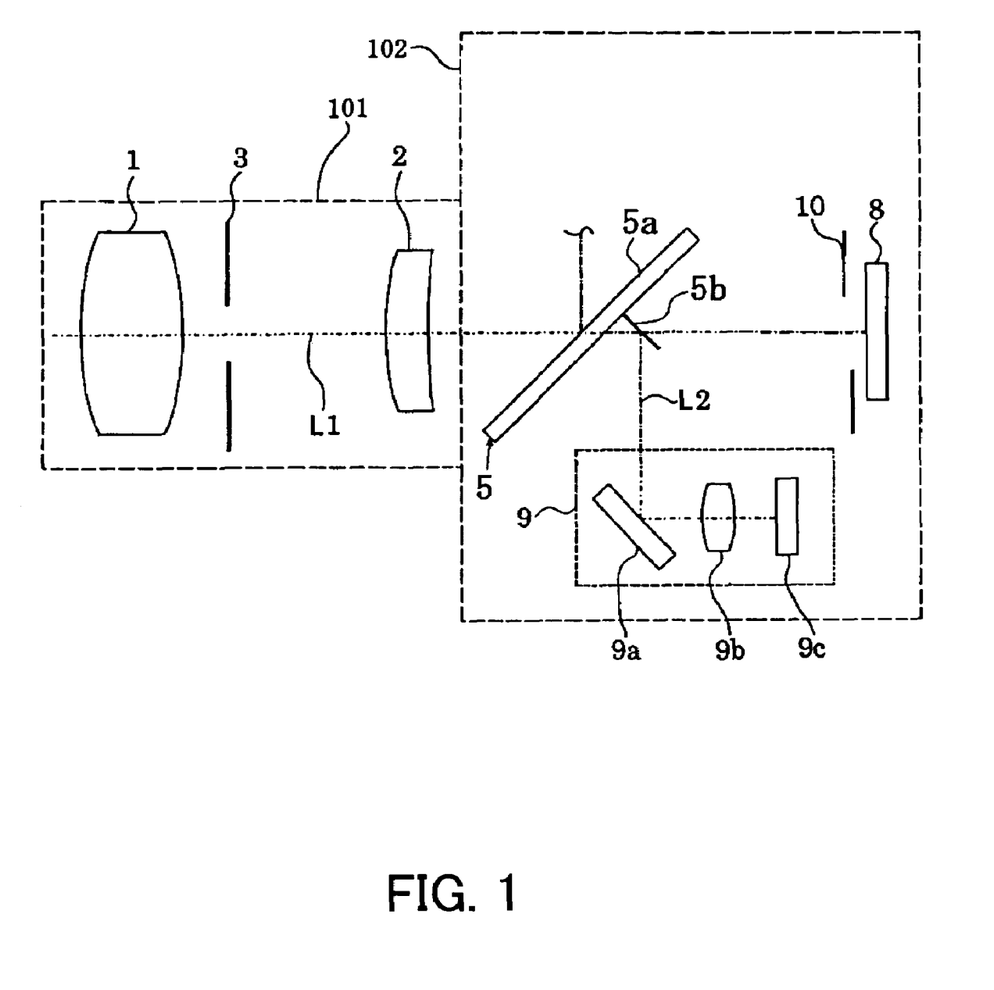
FIG. 1 shows the structure of a camera system in Embodiment 1 of the present invention.

FIG. 1 shows the structure of main components of a camera system (an optical apparatus) which is Embodiment 1 of the present invention. The camera system of Embodiment 1 has a camera body 102 and a lens apparatus 101 which is mounted on the camera body 102. While Embodiment 1 will be described on the assumption that the camera system is an optical apparatus in which the lens apparatus 101 is removably mounted on the camera body 102, for example a single-lens reflex camera, it may be an optical apparatus integral with a lens.

Reference numerals 1 and 2 show image-taking lenses. Specifically, the image-taking lens 1 is a zoom lens which can be moved in the direction of an optical axis L to change the focal length of an image-taking optical system. The image-taking lens 2 is a focus lens which is moved in the direction of the optical axis L to adjust focus. Each of the lenses may be formed of a single or a plurality of lenses. Reference numeral 3 shows an aperture serving as a light amount adjusting member which adjusts the amount of light incident on an image plane depending on the luminance of a subject. The image-taking lenses 1, 2, and the aperture 3 are provided in the lens apparatus 101.

Reference numeral 5 shows a mirror which is disposed on an image-taking optical path while the camera body 102 is not taking an image or at a position at which the mirror 5 is moved out of the image-taking optical path while the camera body 102 is taking an image. The mirror 5 has a half mirror 5a and a sub mirror 5b.

The half mirror 5a transmits part of luminous flux passing through the image-taking lenses 1 and 2 toward the image plane and reflects the remaining luminous flux toward a viewfinder optical system, not shown, provided in the camera body 102 while the camera system is not taking an image. The sub mirror 5b disposed closer to the image plane than the half mirror 5a reflects the luminous flux transmitted through the half mirror 5a toward a focus detection unit 9, later described, while the camera system is not taking an image.

Reference symbols L1 and L2 show the optical axis of the luminous flux split by the half mirror 5 toward the image plane and the optical axis of the luminous flux toward the focus detection unit 9, respectively. Reference numeral 8 shows an image-pickup device (for example, a CCD or CMOS sensor) which photoelectrically converts a subject image (an optical image) formed by the image-taking lenses 1 and 2.

Reference numeral 10 shows a shutter (a focal plane shutter) which limits the amount of light incident on the image-pickup device 8 in terms of time by opening and closing a front curtain and a rear curtain. The shutter member 10 is retracted from the optical path of image-taking luminous flux to start exposure in response to turn-on or turn-off of a release switch when an image is taken, while the shutter 10 is closed when data is read from the image-pickup device 8.

Reference numeral 9 shows the focus detection unit serving as a first focus detecting means which receives the luminous flux (AF luminous flux) reflected by the sub mirror 5b to detect the focus state of the image-taking optical system (including the image-taking lenses 1 and 2) in the phase difference detection method. Reference numeral 9a shows an AF mirror (a mirror with high reflectance) which reflects the AF luminous flux from the sub mirror 5b toward an AF sensor, later described. Reference numeral 9b shows a separator lens which divides the pupil of the AF luminous flux. Reference numeral 9c shows the AF sensor which receives the AF luminous flux split by the separator lens 9b to detect a focus adjustment state (a defocus amount) with the phase difference detection method.

Figure 2:
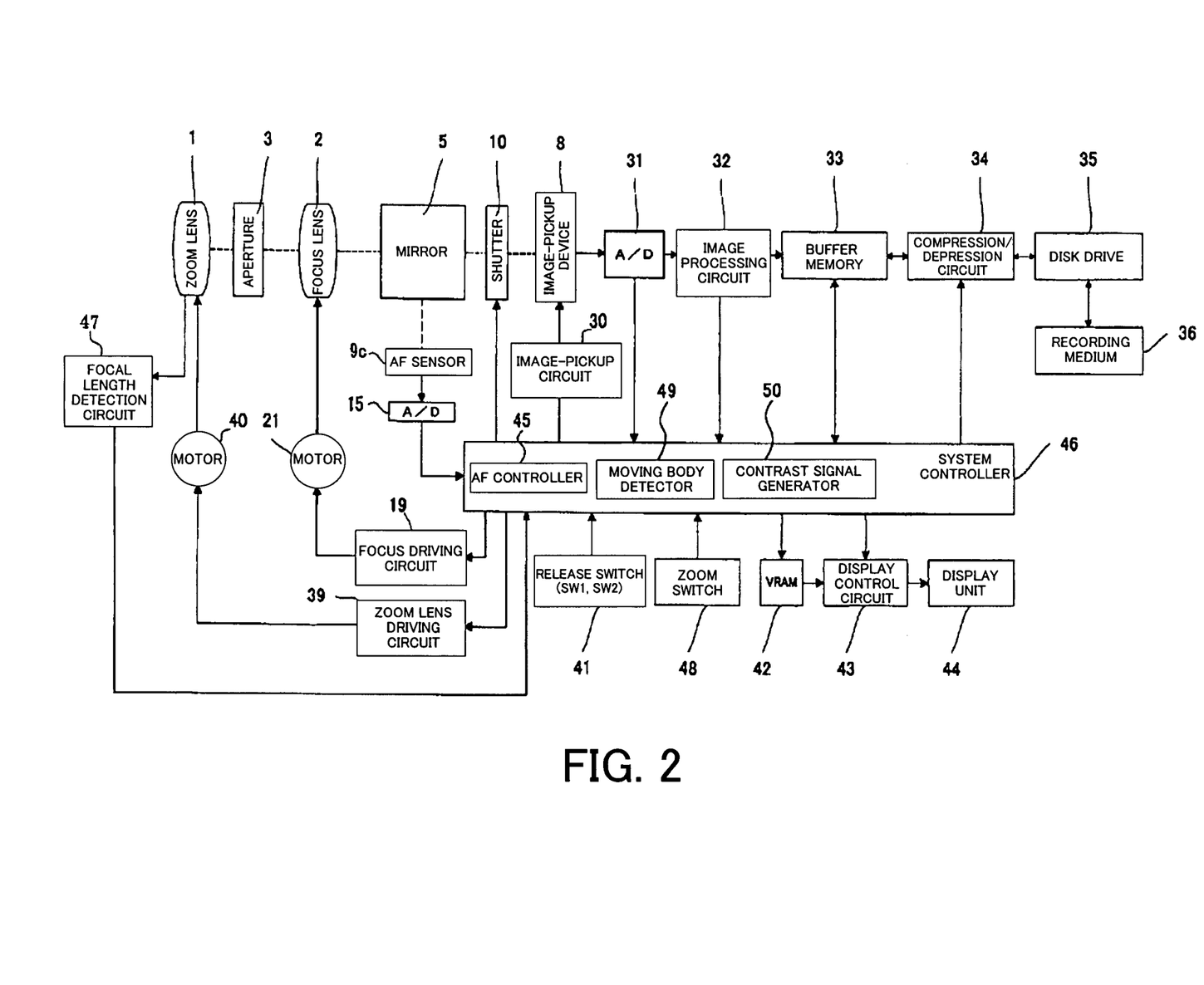
FIG. 2 is a block diagram showing the structure of the camera system in Embodiment 1 of the present invention.

Next, description will be made of the circuit structure of the camera system in Embodiment 1 with reference to FIG. 2. FIG. 2 is a block diagram showing the structure of the camera system of Embodiment 1. The members identical to those described in FIG. 1 are designated with the same reference numerals.

A system controller 46 controls driving of the image-pickup device 8 through an image-pickup circuit 30. A signal read from the image-pickup device 8 is converted into a digital signal by an A/D converter 31 and then subjected to predetermined image processing (color processing and the like) by an image processing circuit 32. The image signal produced in the image processing circuit 32 is once stored in a buffer memory 33.

For saving the image information, the data stored in the buffer memory 33 is compressed using JPEG or the like by a compression/decompression circuit 34, and then is recorded on a recording medium (for example, a semiconductor memory or a magnetic disk) 36 through a disk drive 35.

The image information recorded on the recording medium 36 is decompressed by the compression/decompression circuit 34 and stored in the buffer memory 33, and then displayed as a taken image on a display unit (an LCD (liquid crystal display) monitor) 44 by a display control circuit 43 through a VRAM (video RAM) 42.

The system controller 46 is provided with an AF controller 45, a moving body detector 49, and a contrast signal generator 50. The contrast signal generator 50 serves as a second focus detecting means which generates an AF evaluation value (sharpness: the high-frequency component of a luminance signal of a subject) based on an output signal from the image-pickup device 8 and outputs the signal to the AF controller 45.

Thus, the AF controller 45 receives an output signal from the AF sensor 9c and the AF evaluation value from the contrast signal generator 50 to perform both of AF control with the phase difference detection method and AF control with the contrast method. The system controller 46 controls driving of a focus motor 21 through a focus driving circuit 19 to drive the focus lens 2 based on the AF control in the AF controller 45.

The system controller 46 also performs control in the camera system, and receives instructions from a release switch 41 and a zoom switch 48 to perform operation in accordance with the instructions.

The release switch 41 has a switch SW1 which gives an instruction to start image-taking preparative operation (such as photometric operation and focus adjustment operation) and a switch SW2 which gives an instruction to start image-taking operation (such as recording of a signal read from the image-pickup device 8 on the recording medium 36). The zoom switch 48 gives an instruction to switch the focal length of the image-taking optical system.

Upon reception of an instruction from the zoom witch 48, the system controller 46 controls driving of a zoom motor 40 through a zoom lens driving circuit 39 to drive the zoom lens 1, and monitors (detects) the position (the focal length of the image-taking optical system) of the zoom lens 1 based on an output signal from a focal length detection circuit 47.

When a controller is provided for each of the camera body 102 and the lens apparatus 101, it is possible that some of the operations of the system controller 46 are performed by the controller in the camera body 102 and the others are performed by the controller in the lens apparatus 101.

Next, description will be made of the principles and processing of the phase difference detection method in the focus detection unit 9 with reference to FIGS. 3A to 3C and FIG. 4.

Figure 3A:
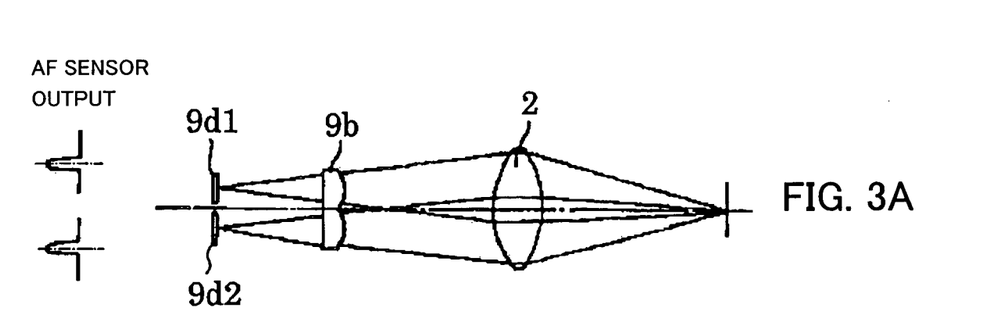
FIGS. 3A to 3C are explanatory diagrams of the principles of a phase difference detection method in Embodiment 1 of the present invention.

Reference numeral 9b shows the separator lens which converges the AF luminous flux reflected by the half mirror 5a on paired photoelectrical conversion element lines 9d1 and 9d2. FIG. 3A shows the lens position and the sensor output in an in-focus state, in which the light is focused on each center of the paired photoelectrical conversion element lines 9d1 and 9d2 in the in-focus state.

Figure 3B:
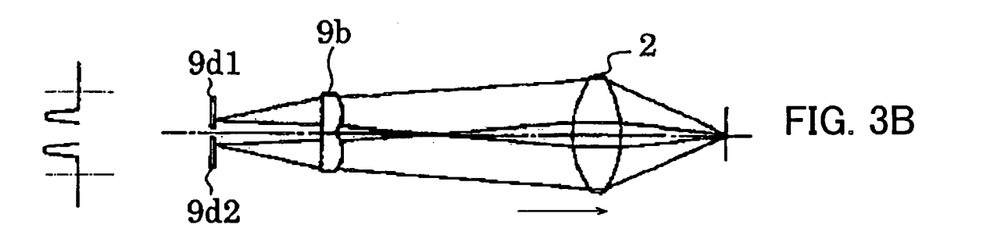
Figure 3C:
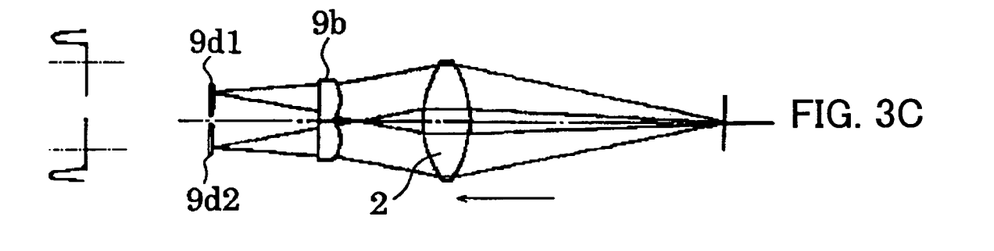

On the other hand, when the focus lens 2 is moved to the right or the left from the in-focus position shown in FIG. 3A, the focus positions are shifted toward the ends of the paired photoelectrical conversion element lines 9d1 and 9d2 as shown in FIGS. 3B and 3C. Specifically, in the state shown in FIG. 3B (the state of front focus), the focus positions of the two luminous fluxes are shifted such that they come closer to each other. In the state shown in FIG. 3C (the state of rear focus), the focus positions of the two luminous fluxes are shifted such that they are moved away from each other.

Thus, the shift amount and the shift direction of the focus positions can be detected and calculated to determine a signal necessary for driving the focus lens 2 to an in-focus position.

Figure 4:
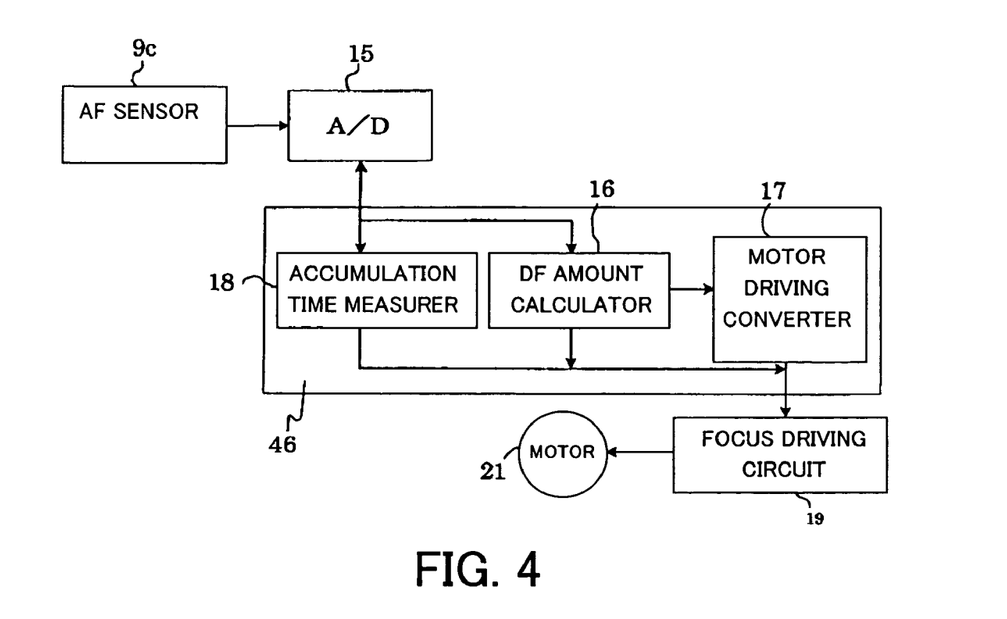
FIG. 4 is a block diagram showing the operation and structure of the phase difference detection method in Embodiment 1 of the present invention.

FIG. 4 is a block diagram showing the structure for performing the AF operation with the phase difference detection method.

Charge is accumulated on the paired photoelectrical conversion element lines 9d1 and 9d2 until the level of an output signal from the AF sensor 9c reaches a predetermined value or until a predetermined time (Tmax) determined in the system controller 46 elapses. After the charge accumulation is completed, the output signal from the AF sensor 9c is quantized by the A/D 15 and then input to the system controller 46.

The quantized information is input to a Df amount calculator 16 for calculation of a shift amount and is normalized as a defocus amount Df. The normalized defocus amount Df is input to a motor driving amount converter 17 which calculates a driving amount of the focus motor 21 corresponding to the defocus amount Df. The focus motor 21 is driven by the required amount corresponding to the calculated value to move the focus lens 2 to an in-focus position.

The defocus amount Df output in the phase difference detection method is also used for processing of moving body detection in the moving body detector 49. As described above, once an in-focus state is achieved, the in-focus state is maintained unless the subject moves, so that it is possible to detect whether or not the subject is moving by detecting whether or not an in-focus state is maintained.

Specifically, once the focus lens 2 is moved to an in-focus position through focusing processing, the in-focus state is maintained unless the subject moves, and the defocus amount Df calculated in this event is not changed. Thus, the moving body detector 49 calculates the defocus amount Df in a predetermined time a predetermined number of times and calculates a change amount $\Delta Df$ of the defocus amounts Df calculated the predetermined number of times. The moving body detector 49 determines whether or not the $\Delta Df$ is equal to or higher than a predetermined value (a threshold value). When the change amount $\Delta Df$ is equal to or higher than the threshold value, it determines that the subject is moving, that is, the subject is a moving body, and outputs the result to the AF controller 45.

In this manner, the moving body detector 49 performs subject state recognizing operation in which it calculates the defocus amount Df the predetermined number of times to detect the distance to the subject for each calculation and checks a change in the distance to see whether or not the subject is moving.

The moving body detector 49 may perform the calculation of the defocus amount Df and the calculation of the change amount $\Delta Df$. Alternatively, it is possible that a processing signal is output to the Df amount calculator 16 to take defocus amounts Df calculated a predetermined number of times at predetermined intervals, and a change amount $\Delta Df$ is calculated and compared with the threshold value, thereby determining whether or not the subject is a moving body.

In addition, the moving body detecting means in Embodiment 1 is not limited to the abovementioned detection method, and the detection may be performed on the basis of a change in the phase difference, distance, contrast, a change on a switch or the like in the image-taking apparatus, by way of example. Any detection method is applicable with no limitation as long as it can detect whether or not the subject is a moving body.

Figure 5:
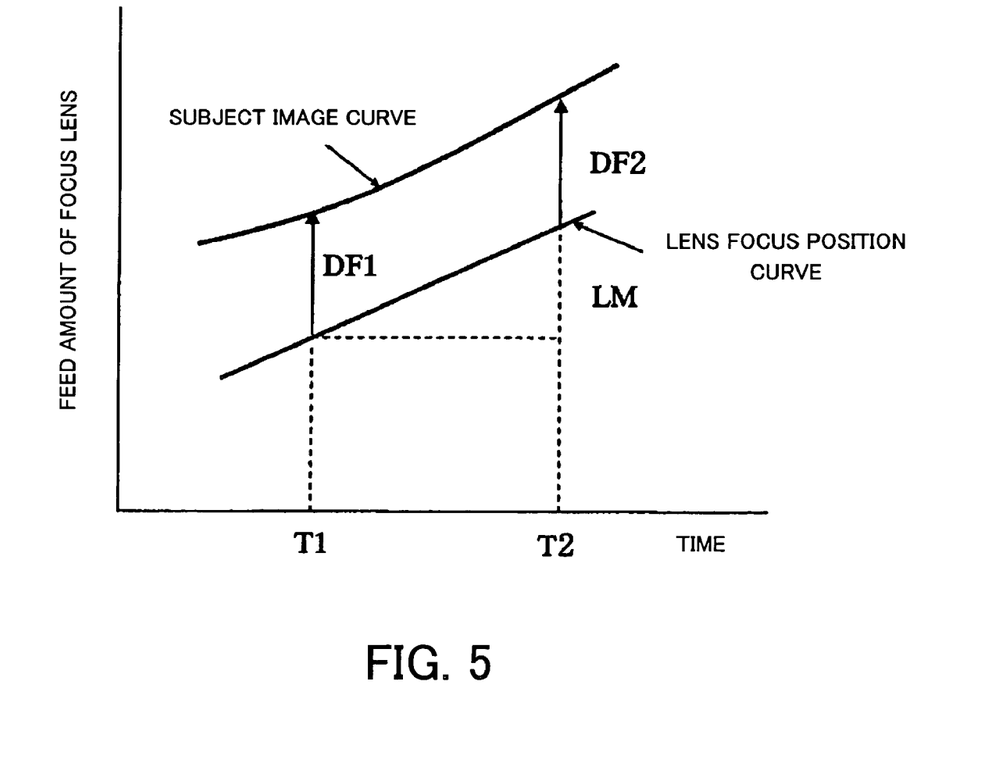
FIG. 5 shows an example of a moving body detecting means in Embodiment 1 of the present invention.

For example, as shown in FIG. 5, a defocus amount Df is calculated with the phase difference detection method and a defocus amount Df2 at a time T2 is detected, repeatedly. The defocus amount detected at the previous time T1 is defined as Df1.

The system controller 46 determines a movement amount LM of the focus lens 2 between the times T1 and T2. The system controller 46 also calculates a subject speed V1 for the position of the focus lens 2 based on the following expression:

$$V1=(DF2+LM-DF1)/(T2-T1) \quad (1)$$

When the movements of the subject image determined in this manner are continuous in the same direction, it can be determined that the subject is a moving body.

Figure 6:
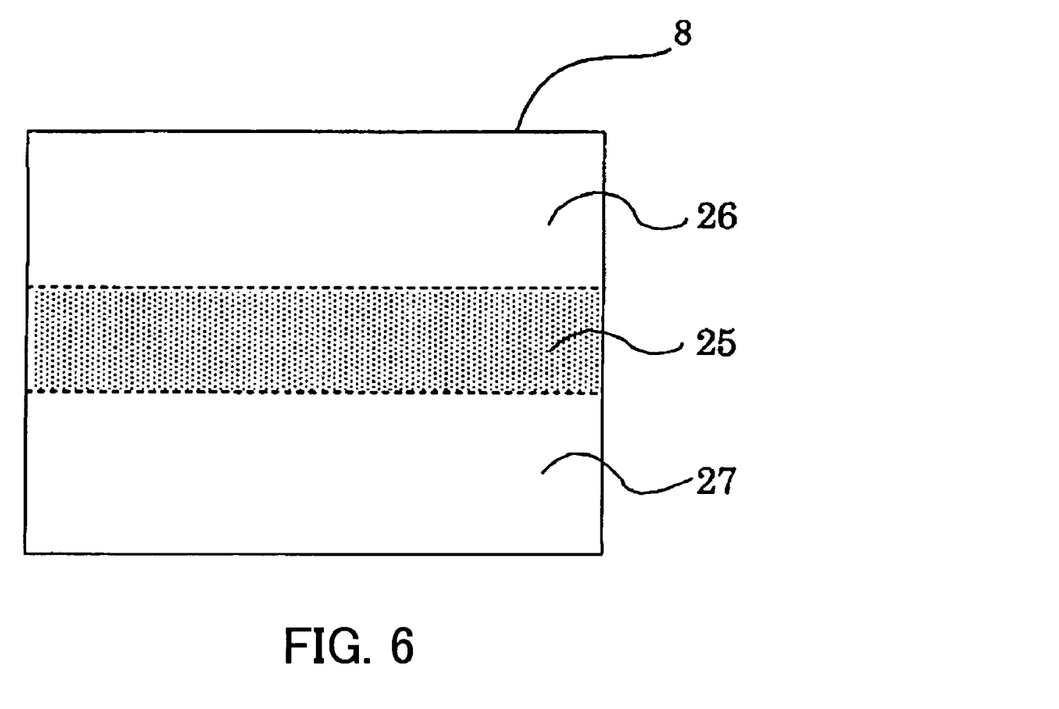
FIG. 6 is a schematic diagram showing the image-taking area of an image-pickup device in Embodiment 1 of the present invention.

FIG. 6 is a schematic diagram showing the image-taking area of the image-pickup device 8. In Embodiment 1, for faster read operation, data is read at normal speed only from a necessary read area and at high speed from the remaining area in flushing transfer. Reference numeral 25 shows a normal read transfer area, while reference numerals 26 and 27 show a former high-speed read transfer area and a latter high-speed read transfer area, respectively. Since data is flushed at high speed except the necessary read area in this manner, partial read operation can be performed faster.

Figure 7:
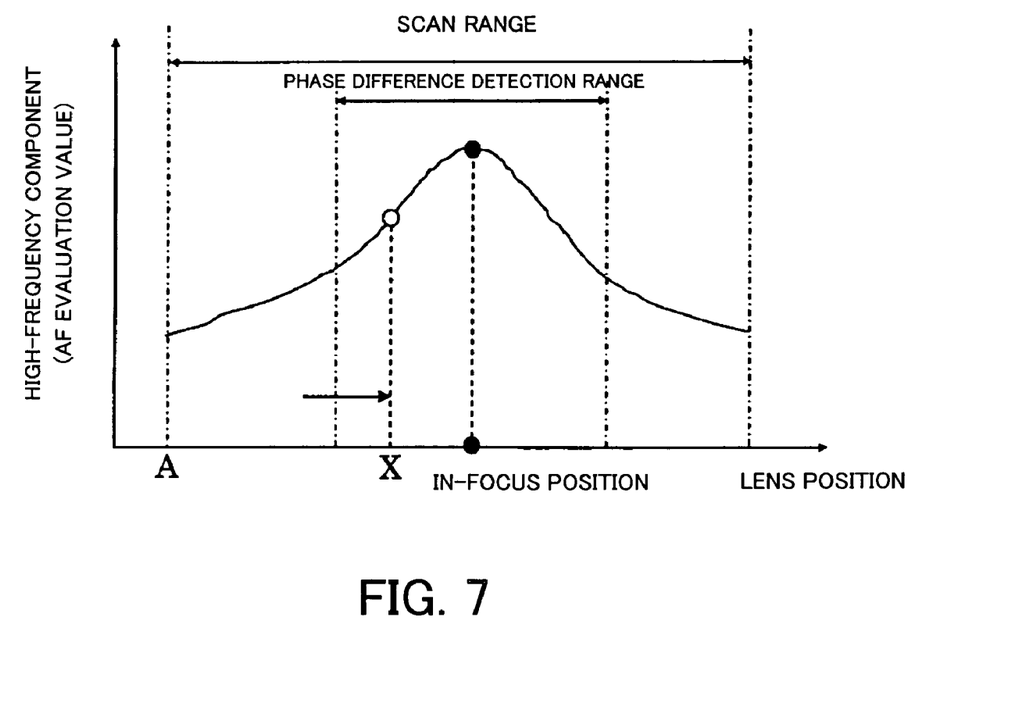
FIG. 7 shows the relationship between the position of a lens and a high-frequency component in a contrast method of Embodiment 1 of the present invention.
Figure 8:
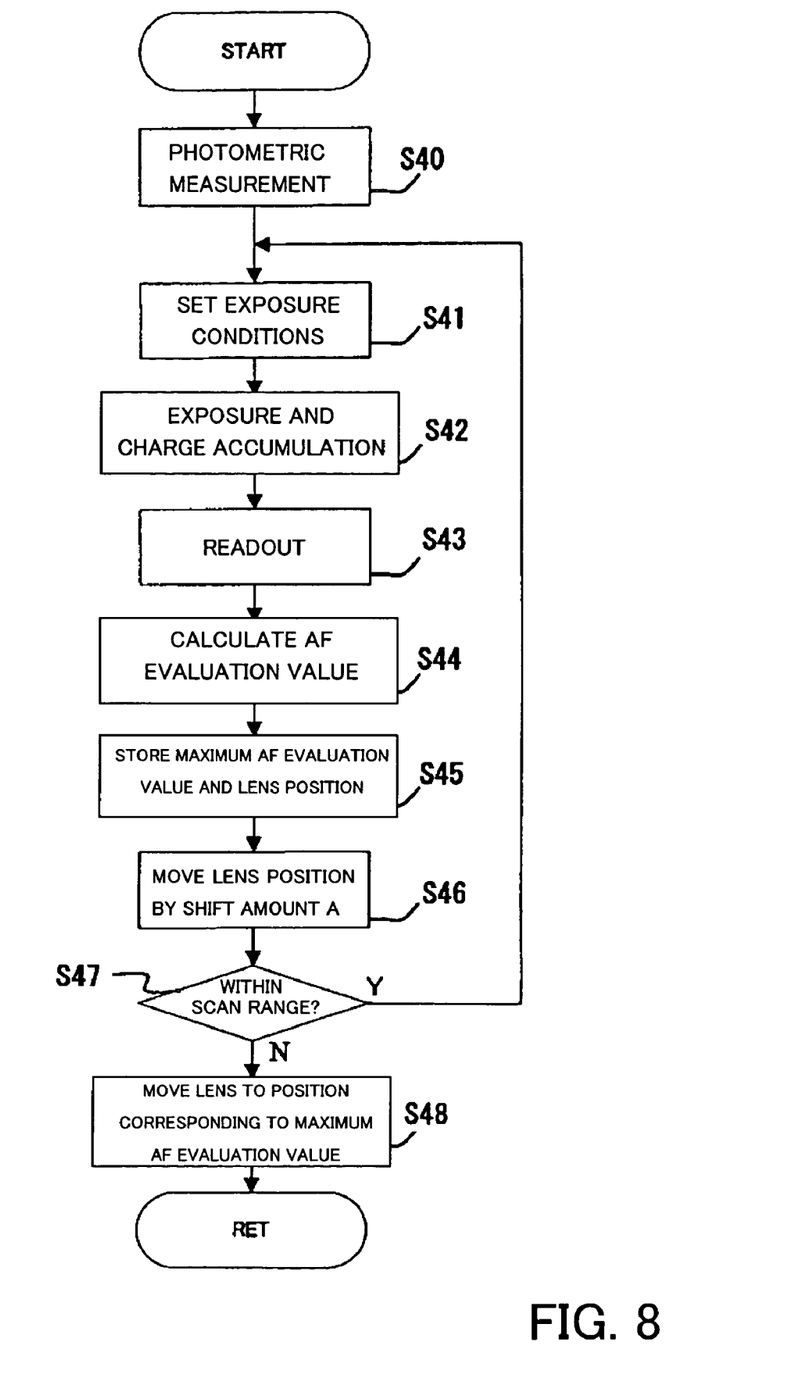
FIG. 8 is a flow chart showing focus detection of the contrast method in Embodiment 1 of the present invention.

Next, the AF control of the contrast method will be described with reference to FIGS. 7 and 8. FIG. 7 shows the relationship between the position of the focus lens 2 and the AF evaluation value in the full range scan method. FIG. 8 is a flow chart of the focus detection in the contrast method.

Assuming that the moving focus lens 2 in the phase difference detection method is at a position X and the focus lens 2 has been moved to the right in FIG. 7, the focus lens 2 is first moved to the left from the position X to a position A (the infinity end or closest end). The focus lens 2 is shifted to the right by a small shift amount a from the position A as the starting point. At each position, the contrast signal generator 50 outputs an AF evaluation value based on a signal output from the image-pickup device 8. The position A mentioned above does not necessarily need to be at the infinity end or closest end, and may be located at a predetermined position. It is only necessary to set the position A such that a desired in-focus position is provided between the positions A and X.

Specifically, as shown in FIG. 8, photometric. measurement is made first (S40). Exposure conditions are set on the basis of the result of the photometric measurement (S41) to perform exposure and charge accumulation (S42). The charge accumulation information is read from the image-pickup device 8 (S43) and output to the contrast signal generator circuit 50. The contrast signal generator circuit 50 outputs an AF evaluation value (S44) and stores the maximum of the AF evaluation values and the position of the focus lens 2 corresponding to the maximum (S45). Then, the focus lens 2 is moved by the small shift amount a (S46).

If the small shift amount a is set to the smallest possible value, high accuracy is achieved. However, a smaller shift amount causes an increased number of detections to result in a longer time taken for the focus operation. On the contrary, if the small shift amount a is extremely increased, the accuracy is reduced to make the system unusable. Also, the speed of the lens movement, the read speed from the image-pickup device 8 and the like are affected. Thus, the small shift amount a is changed to appropriately support the lens unit which is mounted on the camera system.

After the focus lens 2 is moved, it is determined whether or not the position of the focus lens 2 after the movement by the small shift amount a is in a scan range. If it is in the scan range (S47), a series of the operations from the setting of the exposure conditions of the image-pickup device 8 is repeated to scan the predetermined scan range defined by the mounted lens unit and the like (S41 to S46).

If the lens position is out of the scan range (S47), it is determined that the scan of all the scan range is completed to stop a series of the repetitive operations, and the maximum is determined from the AF evaluation values stored until that point. The position of the image plane corresponding to the maximum of the AF evaluation values is determined as the in-focus position, and the focus lens 2 is moved to that position (S48).

Figure 9:
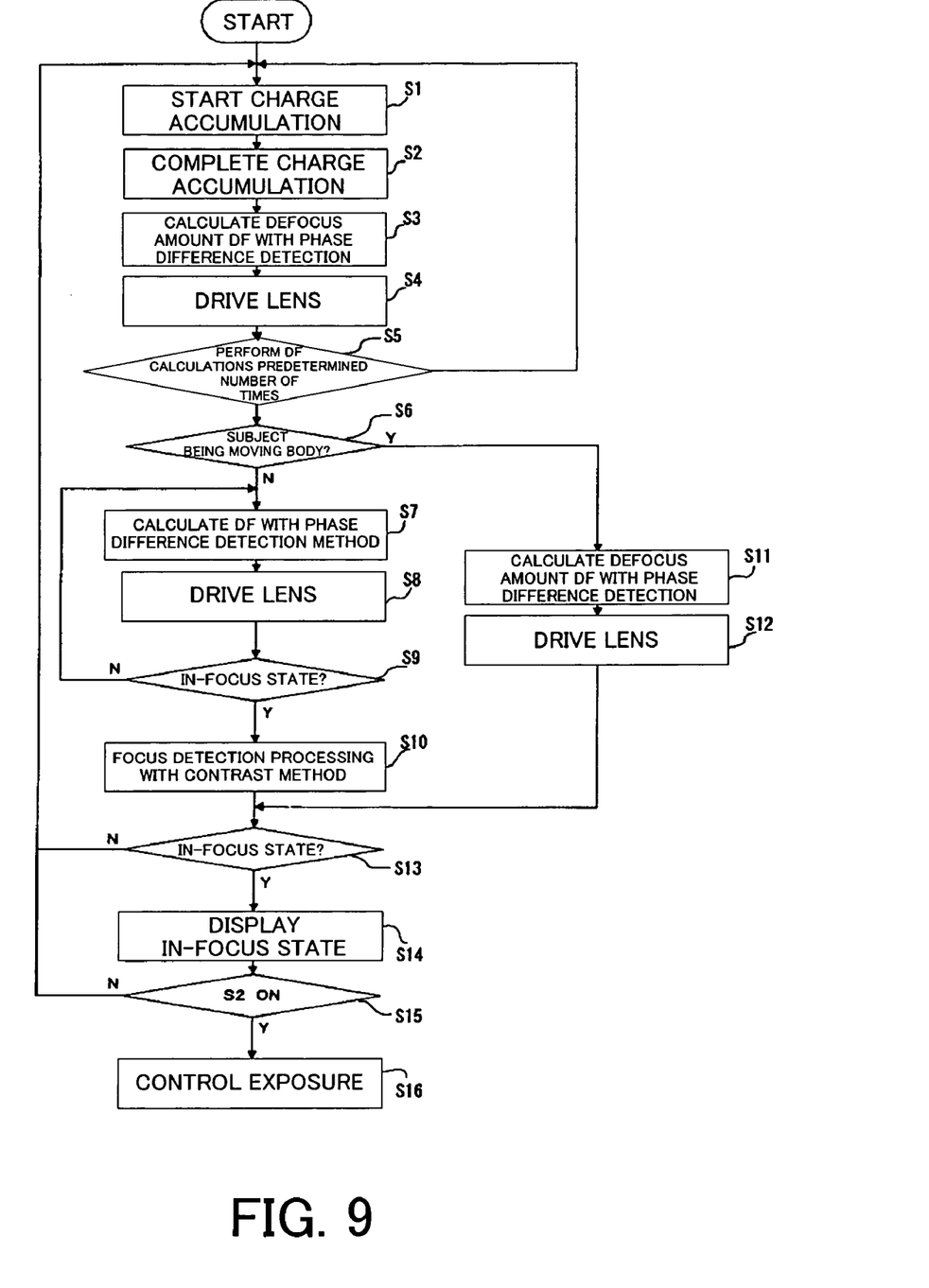
FIG. 9 is a flow chart showing focus control in Embodiment 1 of the present invention.

Next, the AF control of the camera system of Embodiment 1 will be described. FIG. 9 is a flow chart showing the focus control in Embodiment 1.

First, the release switch SW1 is turned ON to start focus detection operation. The focus detection unit 9 accumulates charge on the paired photoelectrical conversion element lines 9d1 and 9d2 until the output from the AF sensor 9c reaches the predetermined value or until the predetermined time elapses (Tmax) as described above (S1). When the charge accumulation processing is completed (S2), the Df amount calculator 16 calculates a defocus amount Df (S3) and the focus lens 2 is driven on the basis of the calculation result (S4).

Next, the system controller 46 performs subject state recognizing processing by the moving body detector 49 (S5). When it is impossible to know whether or not the subject is moving, the flow returns from step 5 to step 1 to repeat the processing from step 1 to step 5, that is, the calculation of the defocus amount Df, a predetermined number of times. After the defocus amount Df is calculated the predetermined number of times (S5), it is determined whether or not the subject is a moving body (S6).

The determination of whether or not the subject is a moving body is performed as follows. The moving body detector 49 calculates the defocus amount Df in the predetermined time the predetermined number of times as described above to calculate a change amount ΔDf of the defocus amounts Df calculated the predetermined number of times. It is determined whether or not the change amount ΔDf is equal to or higher than the predetermined value (the threshold value). If the change amount ΔDf is equal to or higher than the predetermined value, it is determined that the subject is a moving body. If it is determined that the subject is not a moving body, the system controller 46 again calculates the defocus amount Df in the phase difference detection method (S7) and performs lens driving based on the calculation result (S8).

Then, it is determined whether or not an in-focus state is achieved in the phase difference detection method (S9). If it is determined that the in-focus state is not achieved in the AF control of the phase difference detection method, the processing from steps 7 to 9 is repeated to calculate the defocus amount Df again.

If it is determined that the in-focus state is achieved in the AF control of the phase difference detection method (S9), the flow transitions to focus detection processing in the contrast method (S10). The focus detection processing in the contrast method is performed through the abovementioned processing in FIGS. 7 and 8. It is determined whether or not an in-focus state is achieved as a result of the focus detection in the contrast method (S13).

When the subject is not a moving body, it is possible that the flow transitions to the focus detection processing in the contrast method without performing the processing at steps 7 and 8. In Embodiment 1, however, it is desirable to perform the processing at steps 7 and 8 in order to support both cases where the subject is a moving body and is stationary.

On the other hand, when it is determined that the subject is a moving body at step 6, the defocus amount Df is calculated in the phase difference detection method (S11), the lens is driven in accordance with the calculation result (S12), and the flow proceeds to in-focus check processing at step 13. When it is determined that an in-focus state is not achieved in the in-focus check (determination) (step 13), the flow returns to step S1 to perform the phase difference detection again by the focus detection unit 9.

In this manner, at step 13, the in-focus state is determined on the basis of the contrast method when the process went through the processing at step 10, or the in-focus state is determined on the basis of the phase difference detection method when the process went through the processing at step 12.

If it is determined that the in-focus state is achieved at step 13, in-focus display is performed to notify a user or the like of the in-focus state (S14). Turn-on of the release switch SW2 is waited for (S15), and then image-taking operation is performed (S16).

In this manner, in Embodiment 1, the focus control in the optimal sequence can be performed depending on situations for taking images by selecting the first sequence with the phase difference detection method or the second sequence with the contrast method.

Specifically, the AF control circuit 45 selects the first focus detection sequence with the focus detection unit 9 when it is determined that the subject is a moving body, while it selects the second sequence based on the AF evaluation value produced by the contrast signal generator 50 when it is determined that the subject is not a moving body.

Consequently, automatic selection (switching) is possible without missing the opportunity to take a subject due to slow focus detection operation when the subject is moving quickly, for example. The focus control is performed in the optimal sequence depending on the situations of the subject without requiring a user to make troublesome operation. As a result, it is possible to provide the optical apparatus which allows fast and accurate focusing operation.

In addition, the determination of whether or not the subject is a moving body is performed on the basis of the defocus amount Df (the change amount ΔDf) calculated in the focus detection unit 9 with the phase difference detection method. A special detection circuit, a calculation circuit and the like are not required to make it possible to realize simplified AF control.

Embodiment 2

Figure 10:
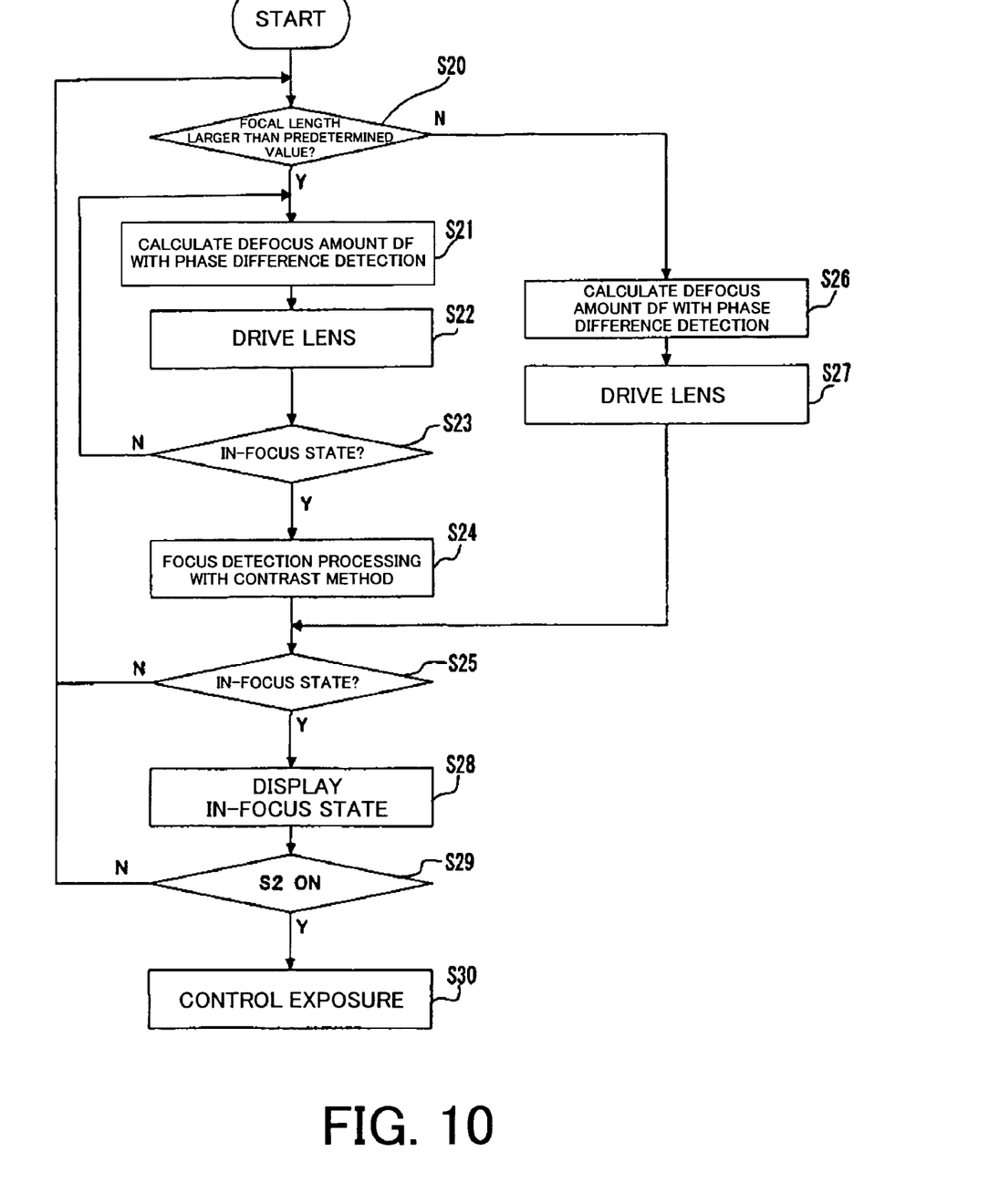
FIG. 10 is a flow chart showing focus control in Embodiment 2 of the present invention.

FIG. 10 illustrates Embodiment 2 of the present invention. FIG. 10 is a flow chart showing AF control in a camera system of Embodiment 2. Since a camera body 102, a lens apparatus 101, a circuit structure and the like are the same as those in Embodiment 1, description thereof is omitted.

The focal depth is larger as the focal length is smaller, and the focal depth is smaller as the focal length is larger, so that precise AF control needs to be performed when the focal length is large. Thus, in the camera system of Embodiment 2, the AF control is performed on the basis of a focal length detected by a focal length detection circuit 47.

First, the focal length detection circuit 47 detects the position of the zoom lens 1, and calculates the focal length based on the position of the zoom lens 1 and outputs the calculated focal length to a system controller 46 as focal length information.

If it is determined that the focal length information input to the system controller 46 is larger than a predetermined value (a threshold value) (S20), a focus detection unit 9 calculates a defocus amount (Df) in the phase difference detection method (S21). Lens driving is performed in accordance with the Df calculation result (S22), and it is determined whether or not an in-focus state is achieved in the AF control of the phase difference detection method (S23).

If it is determined that the in-focus state is not achieved in the AF control of the phase difference detection method, the processing from step 21 to 23 is repeated to calculate the defocus amount Df again. If it is determined that the in-focus state is achieved in the AF control of the phase difference detection method (S23), the flow proceeds to focus detection processing in the contrast method (S24, see FIG. 8). It is determined whether or not an in-focus state is achieved through the focus detection of the contrast method (S25). If it is determined that the in-focus state is not achieved, the flow proceeds to the processing of detecting the focal length by the focal length detection circuit 47 (S20).

On the other hand, if it is determined that the focal length is smaller than the predetermined value (equal to or smaller than the predetermined value), the defocus amount Df in the phase difference detection method is calculated (S26). Then, lens driving is performed in accordance with the Df calculation result (S27) to move to in-focus check processing (S25). If it is determined that an in-focus state is not achieved in the in-focus check processing (S25), the flow returns to step 20 to perform the focal length detection processing again by the focal length detection circuit 47.

If it is determined that the in-focus state is achieved at step 25, in-focus display is performed for a user (S28). If a release switch SW2 is turned ON (S29), control for taking images is performed (S30).

In this manner, in Embodiment 2, an AF control circuit 45 selects the first focus detection sequence with the focus detection unit 9 when the focal length detected by the focal length detection circuit 47 is small, or selects the second sequence based on an AF evaluation value produced by a contrast signal generator 50 when the focal length is large.

Consequently, automatic switching to the optimal sequence is performed without requiring a user to make troublesome operation, and fast and accurate focus control can be realized.

Embodiment 3

Figure 11:
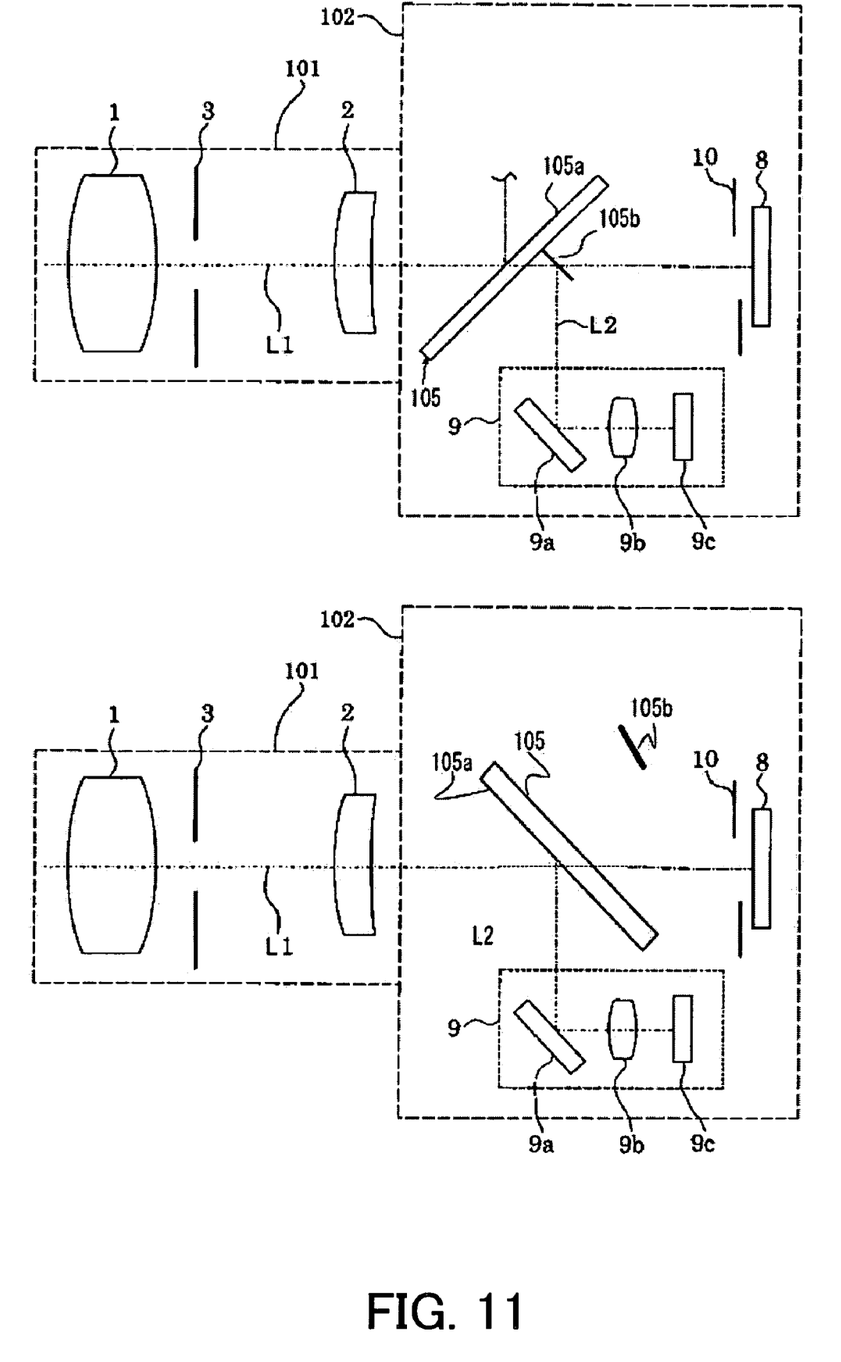
FIG. 11 shows the structure of a camera system which is Embodiment 3 of the present invention.

FIG. 11 shows the structure of main components of a camera system (an optical apparatus) which is Embodiment 3 of the present invention. The camera system of Embodiment 3 has some of the components different from those of the camera system (the optical apparatus) described in FIG. 1. The common components are designated with the same reference numerals and description thereof is omitted. Embodiment 3 is characterized by a mirror 105.

Specifically, when the camera system is in an OVF (Optical View Finder) state as a first state, a half mirror 105a transmits part of luminous flux passing through image-taking lenses 1 and 2 toward an image plane and reflects the remaining luminous flux toward a viewfinder optical system, not shown, provided in a camera body 102. A sub mirror 105b disposed closer to the image plane than the half mirror 105a reflects the luminous flux transmitted through the half mirror 105a toward a focus detection unit 9 while the camera is not taking an image. This state is also seen in Embodiments 1 and 2.

On the other hand, when the camera system is in an LCD monitoring state as a second state, the half mirror 105a transmits part of luminous flux passing through the image-taking lenses 1 and 2 toward an image-pickup device (for example, a CCD or CMOC sensor) 8 and reflects the remaining luminous flux toward the focus detection unit 9. In this LCD monitoring state, the sub mirror 105b has been moved to a position out of the optical path of a subject.

In the LCD monitoring state, the image-pickup device 8 can be on the optical path of the subject, unlike the OVF state. Thus, a system controller 46 can cause a display control circuit 43 to display a taken image on a display unit (an LCD (Liquid Crystal Display) monitor) 44 while phase difference AF is performed in an AF sensor 9. In addition, in the LCD monitoring state, the system controller 46 can perform contrast AF while the phase difference AF is performed in the focus detection unit 9. In other words, the system controller 46 can control an AF controller 45, a moving body detector 49, and a contrast signal generator 50 in parallel. It is possible that, when the camera system is in an image-taking state as a third state, both of the half mirror 105a and the sub mirror 105b are moved to positions out of the path of light passing through the image-taking lenses 1 and 2 and the image-pickup device (for example, a CCD or CMOS sensor) is on the optical path to take images. This state is also seen in Embodiments 1 and 2.

Figure 12:
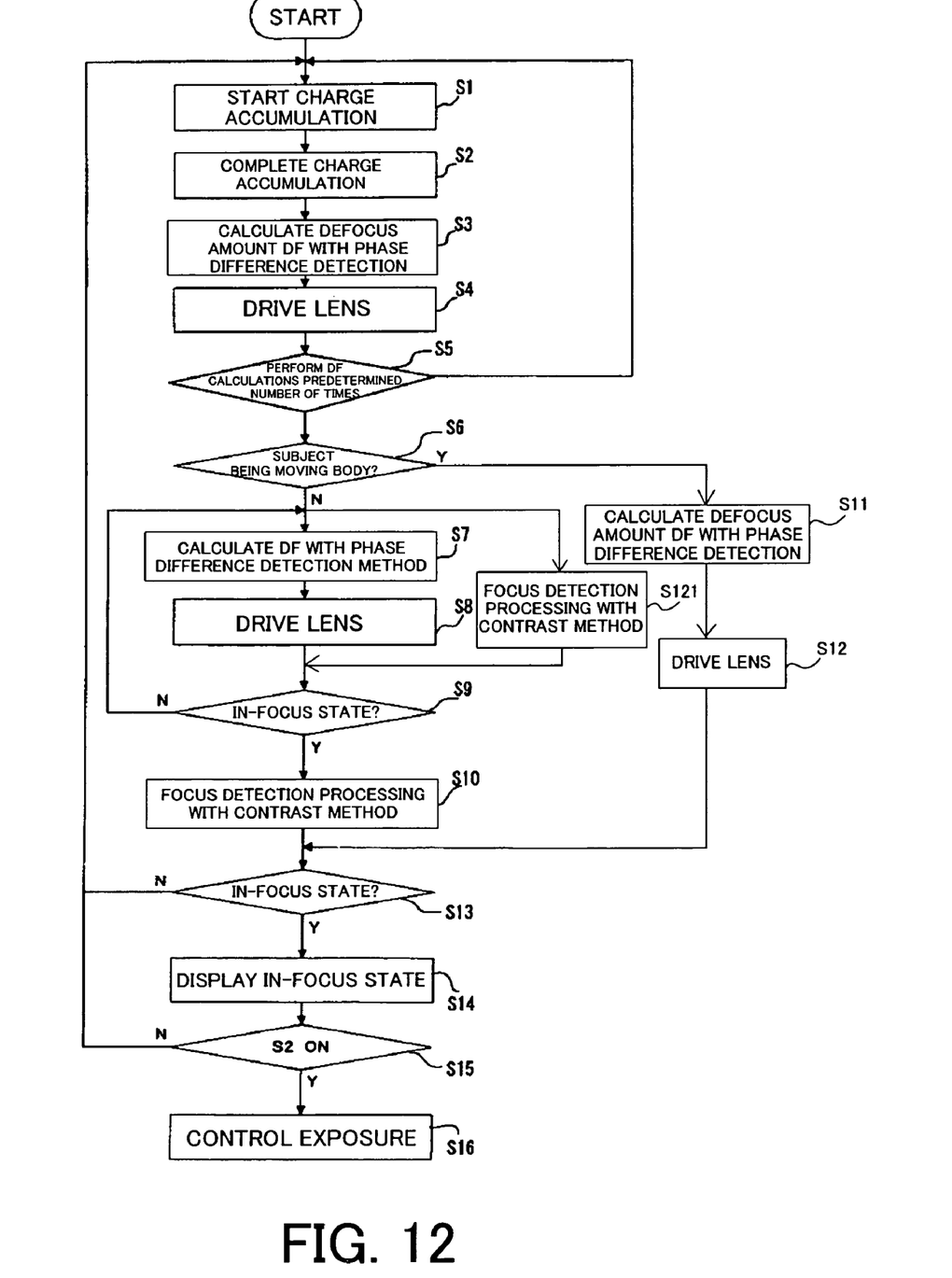
FIG. 12 is a flow chart showing focus control in Embodiment 3.
Figure 13:
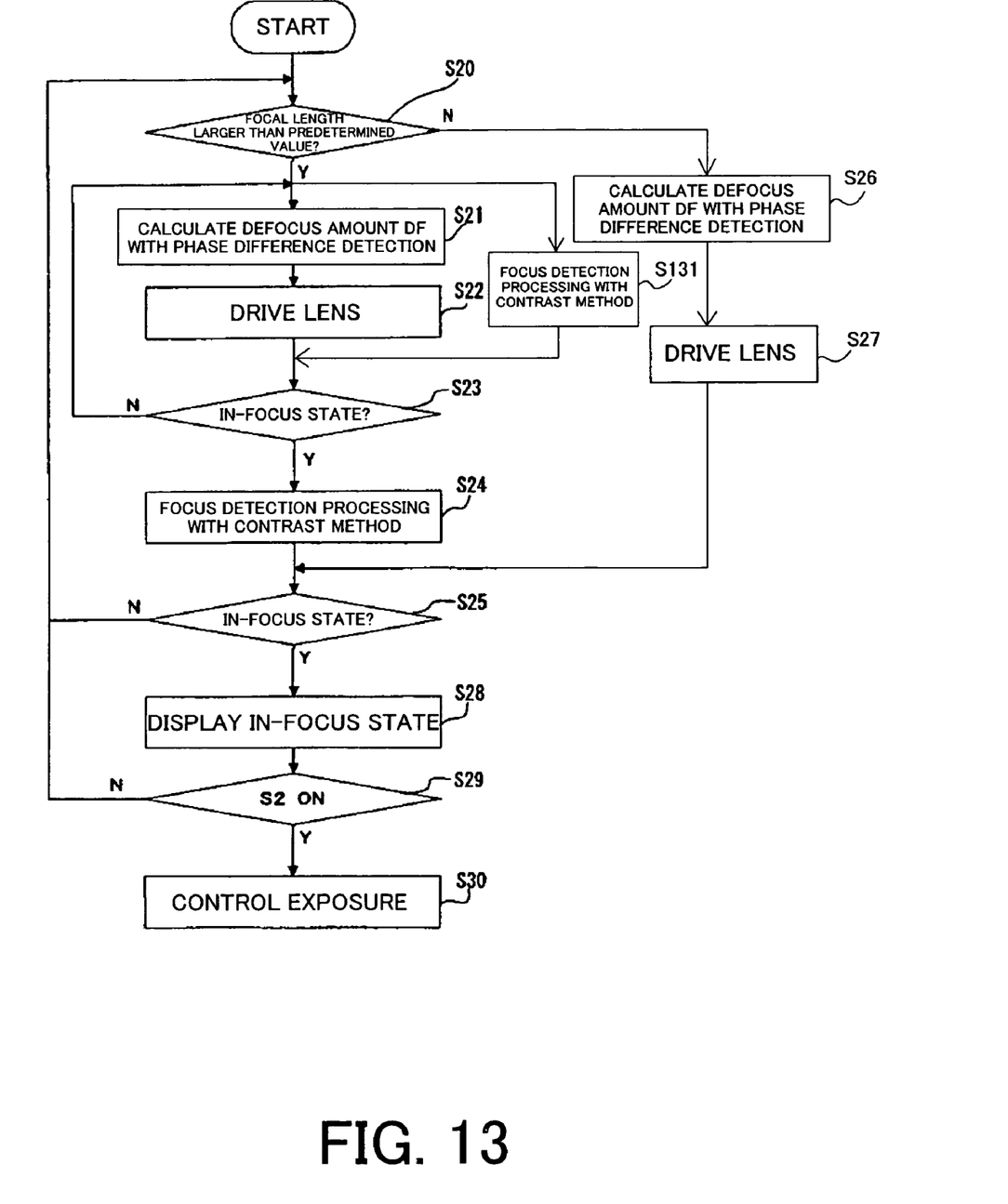
FIG. 13 is a flow chart showing focus control in Embodiment 3.

The camera system (the optical apparatus) of Embodiment 3 is also characterized by its focus control described below. FIGS. 12 and 13 show flow charts for explaining the focus control corresponding to FIGS. 9 and 10, respectively. The processing after step 6 in the flow of FIG. 12, that is, the processing at and after step 7 or 11 represents the control flow in the abovementioned second state. The same processing steps are designated with the same reference numerals. The flow is characterized by step 121 in FIG. 12. Specifically, in parallel with the calculation of a defocus amount Df in the phase difference detection method (S7) and the lens driving based on the calculation result (S8), focus detection processing is performed in the contrast method. This can omit the time for later focus detection processing at step 10 or reduce the processing time. At step 121, an AF evaluation value is taken while lens driving is performed. At step 9, it is determined whether or not an in-focus state is achieved on the basis of the phase difference AF. At step 13, an in-focus state is determined on the basis of the contrast method when the process went through the processing at step 10, or the in-focus state is determined on the basis of the phase difference detection method when the process went through the processing at step 12, similarly to Embodiment 1.

In Embodiment 3, the focus detection processing of the contrast method may be performed in parallel with the processing at steps 11 and 12. In this case, however, the subject is likely to be moving. For this reason, the in-focus state determination based on the phase difference AF is preferentially performed at step 13.

On the other hand, in FIG. 13, the flow is characterized by step 131. Specifically, in parallel with the calculation of a defocus amount Df in the phase difference detection method (S21) and the lens driving based on the calculation result (S22), focus detection processing is performed in the contrast method. This can omit the time for later focus detection processing at step 24 or reduce the processing time. At step 131, an AF evaluation value is taken while lens driving is performed. At step 23, it is determined whether or not an in-focus state is achieved on the basis of the phase difference AF. At step 25, an in-focus state is determined on the basis of the contrast method when the process went through the processing at step 22, or the in-focus state is determined on the basis of the phase difference detection method when the process went through the processing at step 27, similarly to Embodiment 2. In Embodiment 3, the focus detection processing of the contrast method may be performed in parallel with the processing at steps 26 and 27.

As described above, in Embodiments 2 and 3, the hybrid AF control is performed by combining the first focus detecting means with the phase difference detection method and the second focus detecting means with the contrast method, and switching is made to the focus detection processing in the phase difference detection method depending on the focal length. However, it is possible that the focus detection processing is not performed in the phase difference detection method of the hybrid AF control and switching is made to the focus detection processing in the contrast method to achieve focus control when the focal length is large.

According to Embodiments 1 to 3 described above, the focus control is performed in the optimal sequence depending on the result of detection of a moving body, so that the optical apparatus which allows fast and accurate focusing operation can be provided.

This application claims a foreign priority benefit based on Japanese Patent Applications No. 2004-204649, filed on Jul. 12, 2004, which is hereby incorporated by reference herein in its entirety as if fully set forth herein.

What is claimed is:

1. An optical apparatus comprising:
a first focus detector which detects a focus state on a subject on the basis of a phase difference between two images of the subject;
a second focus detector which detects a focus state on the subject in a detection method in which a contrast of an image of the subject is detected; and
a controller which has a function of detecting whether or not the subject is a moving body and a function of performing focus control of an image-taking optical system in a first sequence in which the first focus detector is used and in a second sequence in which the second focus detector is used,
wherein the controller prioritizes the first sequence over the second sequence when the moving body detecting function detects that the subject is a moving body.

2. The optical apparatus according to claim 1, wherein the moving body detecting function detects whether or not the subject is a moving body based on the result of detection with the first detector.

3. The optical apparatus according to claim 2, wherein the moving body detecting function detects whether or not the subject is a moving body based on a change amount of the results of a plurality of detections with the first detector.

* * * * *